(No Model.)

L. NELLESON.
EGG BEATER.

No. 414,566. Patented Nov. 5, 1889.

Witnesses
F. W. Ruben
N. J. Bulkley

Inventor
Lambert Nelleson
By his Attorneys
Singer & Co.

N. PETERS, Photo-Lithographer, Washington, D. C.

UNITED STATES PATENT OFFICE.

LAMBERT NELLESON, OF NEW YORK, N. Y.

EGG-BEATER.

SPECIFICATION forming part of Letters Patent No. 414,566, dated November 5, 1889.

Application filed September 10, 1888. Serial No. 285,034. (No model.)

*To all whom it may concern:*

Be it known that I, LAMBERT NELLESON, a subject of the Emperor of Germany, residing at the city of New York, in the county of New York and State of New York, have invented a new and useful Improvement in Egg-Beaters, of which the following is a specification.

The object of the invention is to produce an egg-beater which will be available for the use of bakers, confectioners, and persons of like occupation to quickly and thoroughly beat any desired quantity of eggs.

The invention consists in the details of combination and construction, substantially as illustrated in the accompanying drawings, hereinafter described, and subsequently pointed out in the claim.

Figure 1:
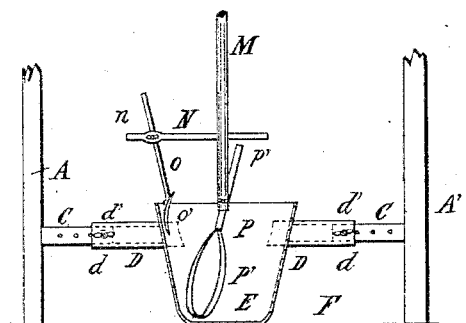
Figure 2:
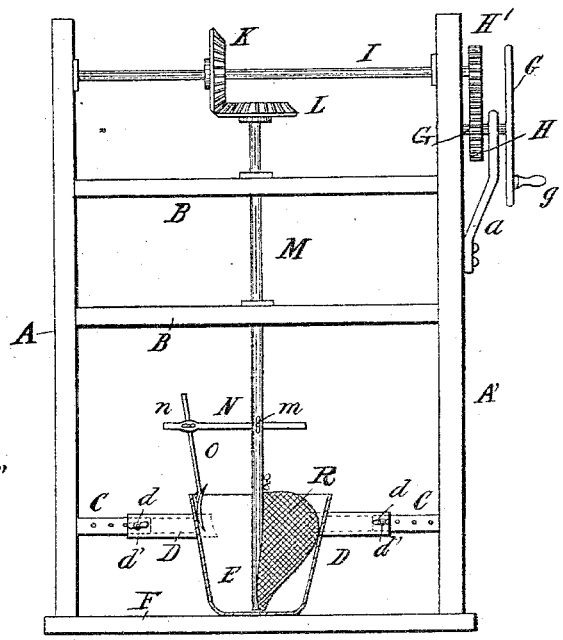
Figure 2A:
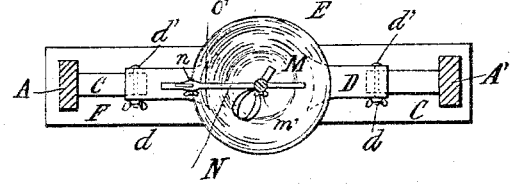
Figure 3:
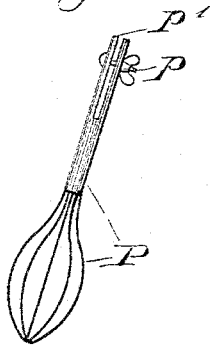
Figure 4:
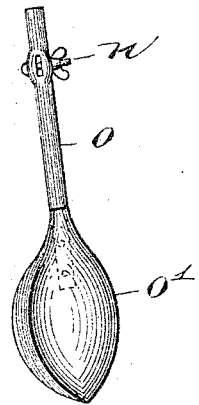
Figure 5:
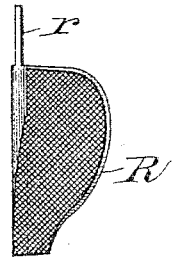

Figure 1 is a partial side view of my newly-invented egg-beater, illustrating the same as arranged for beating the whites of eggs. Fig. 2 is a like view of the same, but arranged for beating the yelks of eggs. Fig. 2ª is a plan view of the pot and some of the accompanying mechanism. Figs. 3, 4, and 5 are detail views of various parts of the mechanism, which will be hereinafter fully described.

A and A′ designate two posts, one on each side of the machine. These are rigidly fastened at the bottom to the base F, which is of sufficient size and strength to support the machine. The posts A and A′ are further secured by cross-bars B and B. Upon the shaft G′, which has its bearings in the post A′ and the bracket $a$, is mounted a fly-wheel G, provided with a handle $g$. Upon this same shaft G′ is also mounted the spur-wheel H. The shaft I is mounted in bearings in the posts A and A′. Upon the outer end of this shaft is mounted the spur-pinion H′, which meshes into the spur-wheel H. Near the middle, upon this shaft I, is mounted the bevel-wheel K. The perpendicular shaft M is journaled in bearings in the cross-bars B B. Upon the upper end of this shaft M is mounted a bevel-wheel L, which meshes into the said bevel-wheel K.

N designates a cross-bar passing through a slot in the shaft M, moving therewith, and adjustable therein by means of the thumb-screw $m$.

E designates a pot or vessel set upon the base F directly under the shaft M.

C C are short horizontal arms or bars attached to the parts A A′. Upon these are sleeved the bifurcated clamps D D, which, when adjusted about the pot E, are held in place by the thumb-nuts $d$ and bolts $d'$. The outlines of these clamps are dotted on the sides of the pot E, the better to illustrate their position. In this pot works a stirrer, designated by P P′. This stirrer is attached diagonally to the shaft M by the thumb-screw $m'$ and to the cross-bar N by the thumb-screw $p$, and in order that it may be properly adjusted has a slot $p'$ cut lengthwise in its handle P. This stirrer, on account of its position with regard to the pot E and the shaft M, when the shaft is turned will whirl in the pot so as to thoroughly agitate the contents of said pot. To prevent such agitation from causing the contents of said pot to run over the edges thereof, a scraper O′ is provided. This scraper is fastened by its handle O to the bar N by means of the thumb-screw $n$. The scraper O′ is bent, as illustrated, so that as it is carried round the inside edge of the pot by the motion of the bar N it will constantly push so much of the contents of said pot as may be upon the edge toward the middle thereof, and thus prevent any of such contents from flowing over the edge of the pot.

To use my invention the various parts are arranged in the position illustrated in the drawings and a quantity of the white of eggs put into the pot E. Then the operator, by means of the handle $g$, turns the wheel G. This by means of the mechanism before described causes the beater P P′ to whirl rapidly in the pot E and thoroughly stir up the white of the egg therein. The scraper O′ in the meantime moving round the inner edge of the pot prevents any overflow. It will then be found that this egg-beater will in a very short time beat the white of eggs in the pot to a proper consistency, the use of the machine making a great saving of time and labor.

For the yelks of eggs I have found it preferable to modify the form of the beater. This modified beater consists of a wing of wiregauze designated by R. In the lower end of the shaft M is a socket, in which this wing R is fastened by means of the tine $r$ and the thumb-screw $m'$. This wing R is bent a little forward, so that when it is whirled by the motion of the shaft M the contents of the pot E will not splash over. This is only adapted for beating the yelks of eggs. In other respects it is used in the same way as the form of the beater first herein described.

What I claim as my invention, and desire to secure by Letters Patent, is—

In an egg-beater, the combination, with the base F, the posts A A', attached thereto, the cross-bars B B, extending between said posts and assisting to secure the same, the bars C C, attached to said posts, the adjustable clamps D D, sleeved upon said bars C C, and the screws $d'$ and thumb-nuts $d$, adjustably securing said clamps, of the shaft G', journaled upon the post A' and the bracket $a$, the wheels G and H, mounted upon said shaft, the shaft I, journaled in the posts A and A', the wheel H', mounted upon said shaft I and meshing into the said wheel H, the bevel-wheel K, also mounted upon said shaft I, the shaft M, journaled on the cross-bars B and B, the bevel-wheel L, mounted upon the top of said shaft M and meshing into the said bevel-wheel K, the cross-bar N, passing through and moving with the shaft M, a pot E, held between the said adjustable clamps D D, a scraper O', attached by its handle O to the bar N and moving around the inner edge of said pot, and beaters, substantially as herein specified, for agitating the contents of said pot, all substantially as and for the purpose set forth.

In witness whereof I hereunto set my hand in presence of two witnesses.

LAMBERT NELLESON.

Witnesses:
FREDK. W. RUBIEN,
C. E. MCDONALD.